(12) United States Patent
Ogino

(10) Patent No.: US 8,122,577 B2
(45) Date of Patent: Feb. 28, 2012

(54) DEVICE AND METHOD OF PRODUCING BALL JOINT

(75) Inventor: Akira Ogino, Tokyo (JP)

(73) Assignee: Ogino Industrial Co., Ltd, Tokyo (JP)

( * ) Notice: Subject to any disclaimer, the term of this patent is extended or adjusted under 35 U.S.C. 154(b) by 0 days.

(21) Appl. No.: 12/670,441

(22) PCT Filed: Oct. 17, 2008

(86) PCT No.: PCT/JP2008/002954
§ 371 (c)(1),
(2), (4) Date: Jan. 25, 2010

(87) PCT Pub. No.: WO2009/060565
PCT Pub. Date: May 14, 2009

(65) Prior Publication Data
US 2010/0205807 A1    Aug. 19, 2010

(30) Foreign Application Priority Data

Nov. 7, 2007 (JP) ................................. 2007-290135

(51) Int. Cl.
*B21B 15/00* (2006.01)
*B21D 53/10* (2006.01)
*B21J 5/00* (2006.01)
(52) U.S. Cl. ............... 29/33 R; 29/898.044; 29/898.045; 29/898.07; 29/441.1; 72/352; 72/354.2
(58) Field of Classification Search .................. 384/192, 384/203, 206; 403/132, 133; 72/352, 353.2, 72/354.2, 398; 29/33 R, 441.1, 446, 505, 515, 898.044, 898.045, 898.046, 898.07
See application file for complete search history.

(56) References Cited

U.S. PATENT DOCUMENTS 2,182,601 A * 12/1939 Venditty .................... 403/37
(Continued)

FOREIGN PATENT DOCUMENTS

JP          61112813          5/1986
(Continued)

*Primary Examiner* — Alexander P Taousakis
(74) *Attorney, Agent, or Firm* — Quinn Law Group, PLLC

(57) ABSTRACT

A ball joint 10 includes a first member 12 having a ball section 14 and a second member 15 having a socket 16. Ball section 14 is accommodated and supported inside socket 16. A pair of dies 20, 30 sandwich a wall 18 surrounding an opening 17 of the socket 16, and are configured to approach each other gradually, utilizing small repetitive vibrations that include an approaching and separating action, thereby intermittently pressing the wall in an inward radial direction. During each interval of the intermittent pressing action, a supporting and rotating device 40 rotates socket 16 (second member 15) in small increments about a central axis C2 of socket 16. Consequently, dies 20 and 30 successively press against a multitude of points on the circumference of the outer surface of wall 18 of the socket, thereby bending wall 18 inward so as to reduce the diameter thereof.

9 Claims, 11 Drawing Sheets

U.S. PATENT DOCUMENTS

| | | | |
|---|---|---|---|
| 3,986,250 A * | 10/1976 | Belsdorf | 29/511 |
| 4,504,166 A * | 3/1985 | Morin | 403/147 |
| 4,916,788 A | 4/1990 | Mitoya | |
| 6,561,716 B1 | 5/2003 | Suzuki et al. | |
| 7,040,812 B2 * | 5/2006 | Boshier et al. | 384/192 |

FOREIGN PATENT DOCUMENTS

| | | |
|---|---|---|
| JP | 63266177 | 11/1988 |
| JP | 05256256 | 10/1993 |
| JP | 08061356 | 3/1996 |
| JP | 09236114 | 9/1997 |
| JP | 10331759 | 12/1998 |
| JP | 200065038 | 3/2000 |
| JP | 2001263331 | 9/2001 |
| JP | 2002160028 | 6/2002 |
| JP | 2003013941 | 1/2003 |
| JP | 2007113590 | 5/2007 |

\* cited by examiner ature patents# DEVICE AND METHOD OF PRODUCING BALL JOINT

CROSS-REFERENCE TO RELATED APPLICATION(S)

This application claims priority to International PCT/JP2008/002954, filed Oct. 17, 2008. The entire contents of the above identified applications are incorporated herein by reference.

TECHNICAL FIELD

The present invention relates to a device for manufacturing a ball joint provided with a first member having a ball section and a second member having a substantially cylindrical socket which accommodates the ball section, and to a method thereof.

BACKGROUND ART

Ball joints are used in a wide range of applications. For example, ball joints are widely used in universal joints employed in the suspension devices or steering devices of automobiles, or the like. Furthermore, ball joints are also used in the joints between pistons and shoes in a hydraulic swash plate piston pump.

A hydraulic swash plate piston pump employs either a ball joint wherein a piston has a ball section and a shoe has a socket which accommodates that ball section, or conversely, a ball joint wherein the shoe has a ball section and the piston has a socket.

Patent Citation 1 discloses reducing the diameter of a wall surrounding the opening of a socket by a caulking process, in a state where a ball section is accommodated in the socket, in the manufacture of a ball joint. As a specific method for a caulking process of this kind, Patent Citation 2 discloses reducing the diameter of a wall surrounding the opening of a socket simultaneously about the whole circumference thereof, by inserting the socket into a cylindrical metal die and pressing the socket against the die in the axial direction.

CITATION LIST

Patent Citation 1

Japanese Patent Application Laid-open No. 10-331759 (Para. 0049, FIG. 1)

Patent Citation 2

Japanese Patent Application Laid-open No. 2003-13941 (Para. 0017, FIG. 5, FIG. 6)

SUMMARY OF THE INVENTION

Technical Problem

In the caulking method disclosed in Patent Citation 2, when the socket is inserted into the cylindrical die, a stud which extends from the ball section accommodated inside the socket must project outside the metal die by passing through a clearance hole provided in the base portion of the cylindrical die. Therefore, the outer diameter of the stud must be smaller than the outer diameter of the socket. However, in a piston and shoe of a hydraulic swash plate piston pump, the portion corresponding to the stud which projects from the ball section described above is the main body of the piston or shoe, and since the outer diameter of these elements is always greater than the outer diameter of the socket, then the caulking method disclosed in Patent Citation 2 cannot be applied directly.

A possible deformation method is one in which the cylindrical die disclosed in Patent Citation 2 is divided into two semi-cylindrical dies along a plane passing through the central axis thereof, the two split dies are opened in the radial direction, a socket is inserted therebetween, and the two split dies are then closed together so as to form a cylindrical die, whereupon the socket is pressed in the axial direction against the cylindrical die thus formed. However, if a caulking method of this kind is adopted, a trace of the interface between the split dies, known as a "parting line", is caused on the outer surface of the socket.

Furthermore, with any of the caulking methods described above, wrinkles caused by distortion during the deformation process are liable to occur on the outer surface of the wall of the socket which have been reduced in diameter. It is surmised that the reason for this is because the diameter of the wall of the socket is reduced in a state where the whole circumference of the wall of the socket is constricted by the cylindrical die.

Furthermore, in general, in manufacturing a ball joint, it is important to ensure a suitable clearance between the inner surface of the socket and the outer surface of the ball section, to avoid damaging the ball section which is accommodated in the socket.

In addition, in general, reducing the diameter of the wall of the socket without damaging the ball section is relatively easy to achieve if the material of the ball section is hard and the material of the socket is soft, but difficult to achieve in cases where the material of the ball section is soft and the material of the socket is hard (for example, ball joints comprising a shoe having a ball section and a piston having a socket often correspond to these conditions).

Consequently, the object of the present invention is to provide a device and method for manufacturing a ball joint whereby parting lines and wrinkles are not liable to occur in the outer surface of a socket when the diameter of the wall of the socket is reduced. A further object of the present invention is to make it easy to ensure a suitable clearance between the inner surface of a socket and the outer surface of a ball section. Moreover, a further object of the present invention is to reduce the diameter of the wall of a socket without damaging a ball section, even in cases where the material of the ball section is soft and the material of the socket is hard.

Solution to Problem

A device for manufacturing a ball joint provided with a first member having a ball section and a second member having a substantially cylindrical socket which accommodates the ball section, as proposed in a first aspect of the present invention, has: a pair of dies for reducing the diameter of a wall which surrounds an opening of the socket of the second member; a rotating and supporting device which supports the second member in a state where the ball section is accommodated inside the socket, and which applies a rotational torque to the second member so as to rotate the socket relatively with respect to the pair of dies about the central axis of the socket; and a pressing device which supports the pair of dies such that the pair of dies sandwich the wall of the socket from an outer side thereof in a radial direction and drives at least one of the pair of dies such that the pair of dies press repeatedly and intermittently in an inward radial direction against the outer surface of the wall of the socket while the rotating and supporting device supports the second member and applies a rotational torque thereto.

According to the manufacturing device described above, the pair of dies press intermittently and repeatedly in an inward direction from the outer side in the radial direction against the wall which surrounds the opening of the socket, in a state where the ball section has been accommodated inside the socket. During the repetition of this intermittent pressing action, a rotational torque is applied to the second member (socket) in order to rotate the second member (socket) relatively with respect to the die about the central axis of the socket. Consequently, the socket is displaced through a certain distance in the rotational direction with respect to the die in each interval between the intermittently repeated pressing actions, thereby shifting from the previous pressing point to the next pressing point on the outer surface of the socket. Consequently, a large number of points through the whole circumference of the outer surface of the wall of the socket are pressed successively, and the diameter of the wall of the socket is thereby reduced uniformly about the whole circumference. By setting the dynamic conditions of the intermittent pressing and rotating actions, it is possible to process the wall of the socket in a desired fashion, while appropriately controlling the clearance between the ball section and the socket. Since a large number of points on the outer surface of the wall of the socket are pressed successively, then wrinkles are not liable to occur on the surface of the wall in comparison with a case where the whole circumference of the outer surface of the wall of the socket is constricted by a die and pressed simultaneously, as in a conventional caulking process. Furthermore, according to the manufacturing device described above, parting lines which have occurred in the case of a conventional caulking process are not produced.

In one preferred embodiment of the present invention, in order to intermittently repeat a pressing action as described above, the pressing device drives at least one die in such a manner that the at least one of the pair of dies vibrates repeatedly in the radial direction of the socket, while the distance of closest approach between the pair of dies in each cycle of the vibration is gradually reduced. More specifically, the pressing device has: a first drive mechanism which moves at least one of the pair of dies forward through a prescribed movement distance in the radial direction over a prescribed movement time period; and a second drive mechanism which vibrates the at least one of the pair of dies in the radial direction with a cycle that is shorter than the movement time period and an amplitude that is smaller than the movement distance, while the first drive mechanism is moving the at least one of the pair of dies forward.

Furthermore, in one preferred embodiment, wherein the rotating and supporting device comprises: a motive power source which generates rotational torque for rotating the second member; a chucking device which holds the second member; and a rotational torque control device which transmits torque from the motive power source to the chucking device. The rotational torque control device adjusts the torque transmitted from the motive power source to the chucking device such that the rotation of the second member is halted or restricted when the socket is pressed by the pair of dies.

Furthermore, in one preferred embodiment, each of the pair of dies has a concave surface-shaped pressing surface which abuts against the outer surface of the wall of the socket and presses the wall in an oblique direction having an inward radial direction component and a rearward axial direction component. By pressing the wall of the socket in an oblique direction having an inward radial direction and a rearward axial direction, rather than simply pressing the wall in an inward radial direction, it becomes easier to process the wall of the socket to a desired bent shape while appropriately controlling the clearance between the ball section and the socket.

Furthermore, in a further preferred embodiment, each of the pair of dies has a first subsidiary pressing surface disposed so as to abut against the outer surface of a first portion of the wall of the socket which is near to the front end of the wall and a second subsidiary pressing surface disposed so as to abut against the outer surface of a second portion of the wall which is distant from the front end of the wall. The first subsidiary pressing surface of each of the pair of dies presses against the first portion thereby reducing the diameter thereof during an early phase of repetition of intermittent pressing, and the second subsidiary pressing the surface of each of the pair of dies presses against the second portion thereby reducing the diameter thereof during a later phase. By adopting a processing sequence whereby, in this way, the portion of the wall of the socket near to the front end thereof is pressed before the portion distant from the front end, and subsequently the portion distant from the front end is pressed, then it is possible to cause the socket to deform so as to achieve an appropriate clearance between the socket and the ball section. This processing sequence is particularly useful in conditions where the socket is harder than the ball section, for instance, if the material of the ball section is a copper alloy and the material of the socket is steel.

According to a second aspect of the present invention, a die having the aforementioned structure which is used in a device for manufacturing a ball joint according to the present invention is provided.

A method of manufacturing a ball joint provided with a first member having a ball section and a second member having a substantially cylindrical socket which accommodates the ball section, as provided according to a third aspect of the present invention, includes: a step of disposing a pair dies for reducing the diameter of a wall surrounding an opening of the socket of the second member so as to sandwich the wall of the socket from an outer side thereof in a radial direction; a step of pressing the outer surface of the wall of the socket repeatedly and intermittently in an inward radial direction by means of the disposed pair of dies, in a state where the ball section is accommodated inside the socket; and rotating the socket relatively with respect to the pair of dies about the central axis of the socket in an interval between the intermittently repeated pressing actions.

Figure 1:
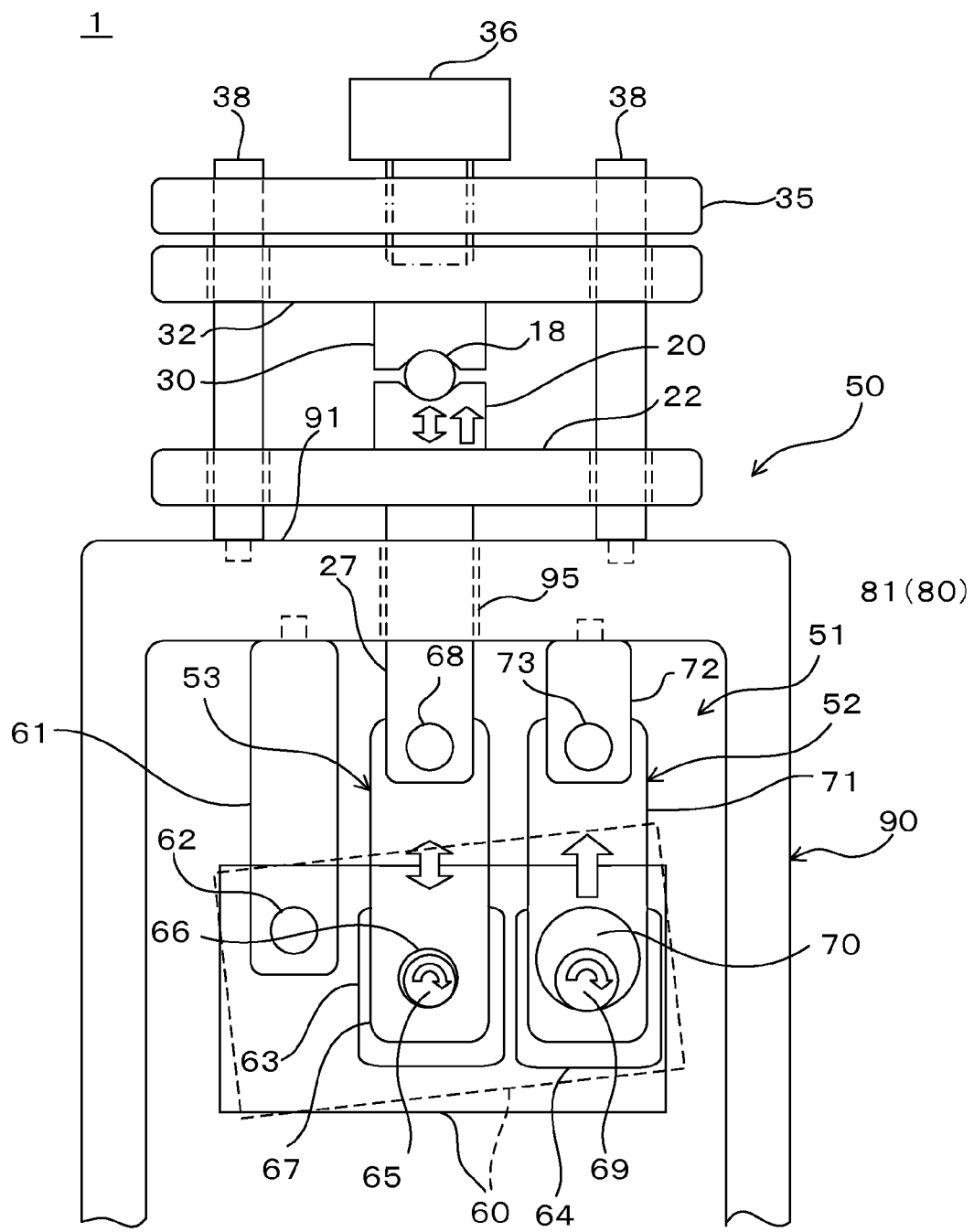
FIG. 1 is a front view showing a schematic diagram of the general composition of one embodiment of a ball joint manufacturing device relating to the present invention.

REFERENCE SIGNS LIST 1 ball joint manufacturing device
10, 200 ball joint
12 piston (first member)
13 piston main body
14 ball section
15 shoe (second member)
16 socket
17 opening of socket
18 wall surrounding opening of socket
20, 30 die
22, 32 slide
27 pressing rod
40 rotating and supporting device
50 pressing device
51 slide drive mechanism
52 first drive mechanism
53 second drive mechanism
100, 110 pressing surface
111 first subsidiary pressing surface
112 second subsidiary pressing surface

DESCRIPTION OF EMBODIMENTS

Below, embodiments of the present invention are described with reference to the drawings.

Figure 2:
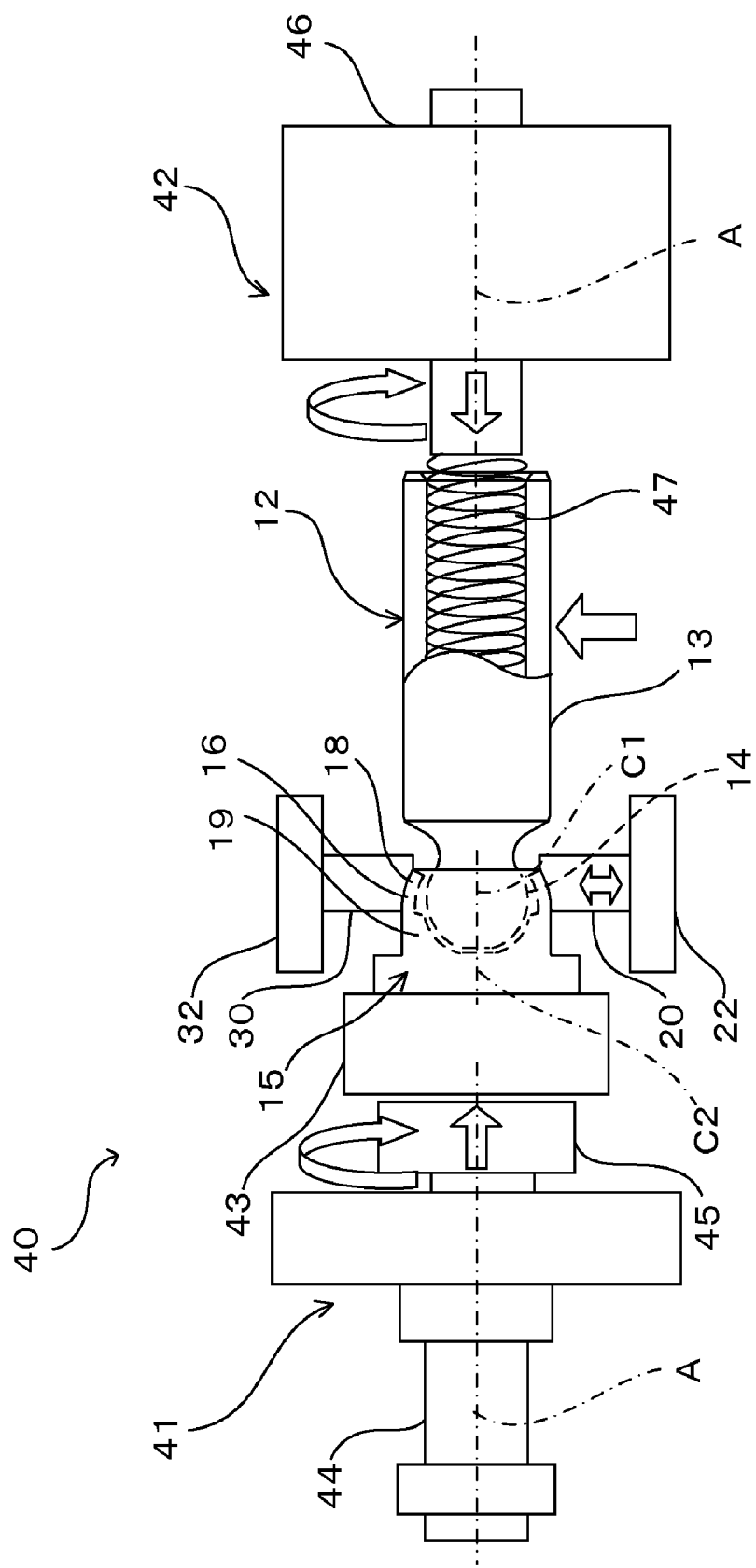
FIG. 2 is a side view showing a schematic diagram of the partial composition of a rotating and supporting device and die provided in the present embodiment.
Figure 3:
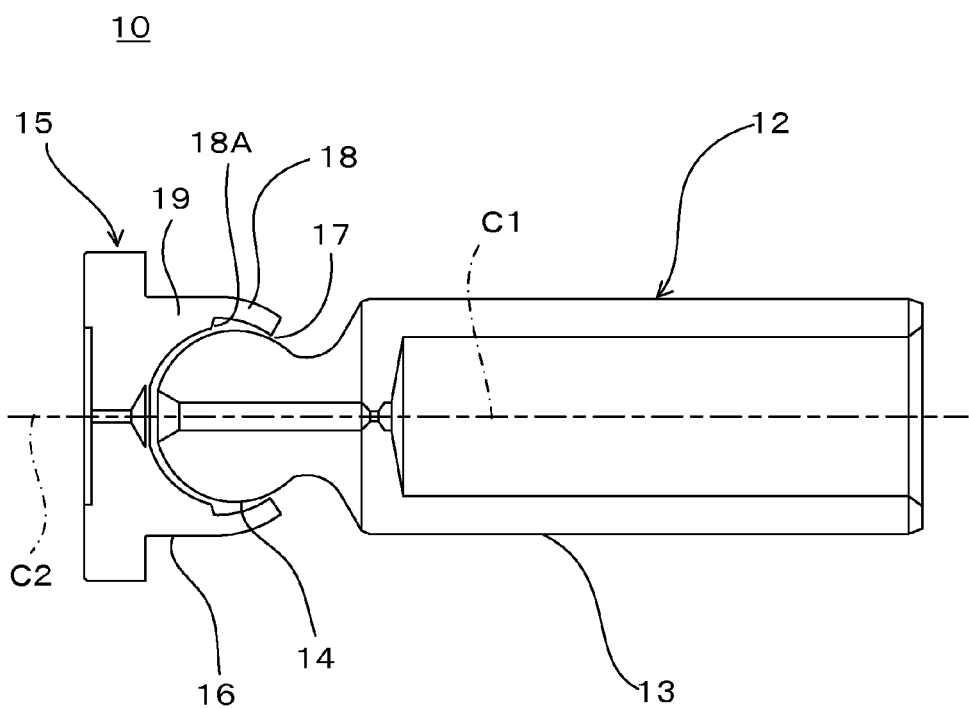
FIG. 3 is a cross-sectional diagram showing the structure of one example of a ball joint which has been manufactured according to the present embodiment (in other words, a ball joint after processing).
Figure 4:
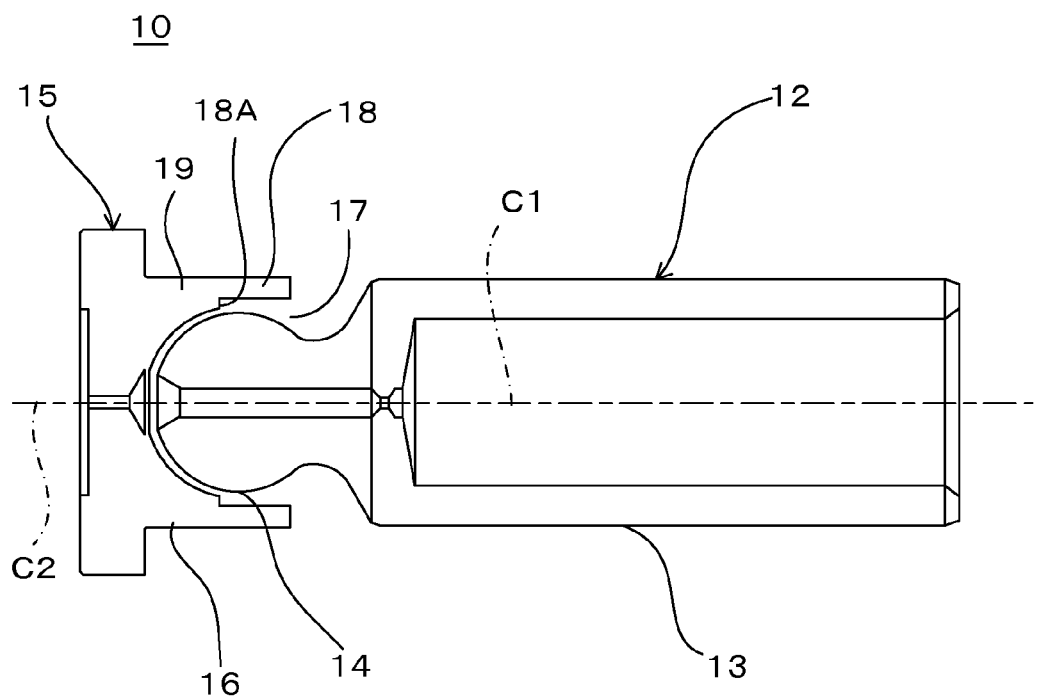
FIG. 4 is a cross-sectional diagram showing the structure of one example of a ball joint before processing according to the present embodiment.

FIG. 1 is a front view showing a schematic diagram of the general composition of one embodiment of a ball joint manufacturing device relating to the present invention. FIG. 2 is a side view showing a schematic diagram of the partial composition of a rotating and supporting device and die provided in the present embodiment. FIG. 3 is a cross-sectional diagram showing the structure of one example of a ball joint which has been manufactured according to the present embodiment (in other words, a ball joint after processing). FIG. 4 is a cross-sectional diagram showing the structure of one example of a ball joint before processing according to the present embodiment.

As shown in FIG. 3, a ball joint 10 which has been manufactured by the ball joint manufacturing device 1 according to the present embodiment (in other words, a processed ball joint) comprises a first member (for example, a piston used in a hydraulic swash plate piston pump) 12 which has a ball section 14, and a second member (for example, a shoe used in a hydraulic swash plate piston pump) 15 which has a socket 16 that accommodates the ball section 14. In FIG. 3, reference numeral C1 indicates the central axis of the ball section 14 and reference numeral C2 indicates the central axis of the socket 16 (FIG. 3 shows a state where the two central axes C1 and C2 are aligned on a single straight line). Here, the ball joint 10 shown in FIG. 3 comprises a piston (first member) 12 and a shoe (second member) 15 which are used in a hydraulic swash plate piston pump, but this structure is merely one example for the purpose of explanation and it goes without saying that the present invention can also be applied to the manufacture of ball joints having other structures, for example, a ball joint comprising a shoe having a ball section and a piston having a socket, or a ball joint comprising a stud having a ball section and a stud having a socket.

The process carried out by the ball joint manufacturing device 1 is the reduction of the diameter of a cylindrical wall 18 which surrounds the opening 17 of the socket 16 of the shoe 15, by bending the wall 18 inward, in such a manner that the ball section 14 does not come out from the socket 16 and desired joint characteristics are obtained. In order to obtain desired joint characteristics, it is imperative that the clearance between the inner surface of the socket 16 and the outer surface of the ball section 14 should be optimal after processing. As shown in FIG. 3 and FIG. 4, in order to make the wall 18 bend readily inward while preventing contact with the ball section when bending inward, a step difference 18A is provided on the inner surface of the wall 18, whereby the thickness of the wall 18 surrounding the opening 17 of the socket 16 is made one step thinner than another wall 19 which is positioned to the inner side of the socket from the wall 18, and the inner surface of the wall 18 is recessed further toward the outside than the other wall 19 which is positioned on the inner side of the socket. Before processing, as shown in FIG. 4, the ball joint 10 is set in the ball joint manufacturing device 1 in a state where the diameter of the wall 18 surrounding the opening 17 of the socket 16 is large and the ball section 14 has been inserted inside the socket 16 via this large opening 17. Thereupon, the thin wall 18 of the socket 16 shown in FIG. 4 is bent inward to reduce the diameter thereof by the ball joint manufacturing device 1, thereby obtaining a final shape such as that shown in FIG. 3.

The ball joint manufacturing device 1 has a pair of dies 20, 30 for reducing the diameter of the wall 18 of the socket 16 as described above. Furthermore, as shown in FIG. 1 and FIG. 2, the ball joint manufacturing device 1 comprises a supporting and rotating device 40, which supports the piston 12 and the shoe 15 from either side during processing, in a state where, as shown in FIG. 2, the ball section 14 is accommodated inside the socket 16 and the central axis C1 of the piston 12 and the central axis C2 of the shoe 15 are aligned on a single straight line following the axis of rotation A, and which applies a rotational torque to the piston 12 and the shoe 15 in such a manner that the piston 12 and the shoe 15 rotate about the axis of rotation A. Furthermore, the ball joint manufacturing device 1 comprises a pressing device 50, which supports the pair of dies 20 and 30 during processing so as to sandwich the wall 18 of the socket 16 from the outer sides in the radial direction, and one of the dies 20 is then driven in the radial direction of the wall 18 (of course, it is also possible to drive both of the dies 20, 30), in such a manner that the outer surface of the wall 18 of the socket 16 is pressed intermittently toward the inner side in the radial direction by the pair of dies 20, 30.

The rotating and supporting device 40 comprises a shoe supporting device 41 which supports and rotates the shoe 15 and a piston supporting device 42 which supports and rotates the piston 12. The shoe supporting device 41 and the piston supporting device 42 rotate the shoe 15 and the piston 12 in the same direction at the same velocity. The shoe supporting device 41 and the piston supporting device 42 are both installed on a horizontally disposed ceiling plate 91 of the base cabinet 90 shown in FIG. 1.

The shoe supporting device 41 comprises a chucking device 43 which holds a base portion 19 of the shoe 15 by means of frictional force, or the like, (for example, a plastic plate which presses against the bottom surface of the shoe 15 by means of the elastic force from an elastic supporting member 47 (described below) and holds the shoe 15 by means of frictional force based on this contact pressure), a first motive power source 44, such as a motor, which generates torque, and a torque control device (typically a clutch) 45 for transmitting the torque from the motive power source 44 to the chucking device 43 and for also adjusting the torque thus transmitted. During processing, the shoe 15 rotates when not pressed by the dies 20, 30, but halts rotation due to the frictional force with the dies 20, 30, when pressed by the dies 20, 30. In other words, during processing, the shoe 15 rotates intermittently. The total amount of rotation of the shoe 15 during processing is equal to or greater than one revolution (360 degrees). When the rotation of the shoe 15 has halted, the clutch 45 adjusts the transmitted torque so as to avoid an overloaded state by causing the motive power source 44 to turn idly with a low torque.

The piston supporting device 42 comprises an elastic supporting member (typically a coil spring) 47 which is inserted into an inner cavity of the piston main body 13 of a piston 12 and which elastically supports the piston main body, and a motive power source 46 such as a motor which generates torque, and the coil spring 47 described above is installed on the rotational shaft of the motive power source 46. During processing, the motive power source 46 rotates the rotational shaft, as well as pushing the rotational shaft along the axis of rotation A in such a manner that the front end of the coil spring 47 is pressed against the bottom surface of the internal cavity of the piston main body 13, whereby the ball section 14 is pressed against the bottom surface of the socket 16 due to the elastic force of the coil spring 47 and the piston 12 is caused to rotate. During processing, the piston 12 rotates continuously rather than intermittently in the manner of the shoe 15. The total amount of rotation of the piston 12 during processing is equal to or greater than one rotation (360 degrees).

In the present embodiment, a torque is applied to the shoe 15 from the shoe supporting device 41, and furthermore a torque is also applied to the piston 12 from the piston supporting device 42, but this does not necessarily have to be the case. Furthermore, it is also possible for a rotational torque to be applied from the shoe supporting device 41 to the shoe 15 only (in other words, only to the second member having the socket 16), while the piston 12 (in other words, the first member having a ball section 14) is fixed so as not to rotate or to rotate only in a dependent fashion by being tensioned by the rotating shoe 15. Moreover, if both the piston 12 and the shoe 15 rotate, desirably, both of these members 12 and 15 rotate in the same direction at the same velocity, but this does not necessarily have to be the case.

The pair of dies 20, 30 described above are made of cold die steel, such as SKD or SKS, and specific forms of the dies are described hereinafter. As shown in FIG. 1 and FIG. 2, this pair of dies 20, 30 are disposed so as to sandwich, from the outer sides in the radial direction, the wall 18 surrounding the opening 17 of the socket 16 which is supported by the rotating and supporting device 40. One die (hereinafter, the lower die) 20 is disposed below the socket 16 which is supported by the rotating and supporting device 40 and is installed on a lower slide 22 which is disposed on the pressing device 50. The other die (hereinafter, called upper die) 30 is disposed above the socket 16 which is supported by the rotating and supporting device 40 and is installed on an upper slide 32 which is disposed on the pressing device 50. Both the lower slide 22 and the upper slide 32 are able to move in a vertical direction along two frame rods 38 which are fixed in a vertical upright fashion on the ceiling plate 91 of a base cabinet 90. The lower slide 22 is coupled to a pressing rod 27 which projects above the ceiling plate 91 via a through hole 95 provided in the central portion of the ceiling plate 91 of the base cabinet 90. During processing, the lower die 20 which is installed on the lower slide 22 is driven by the pressing rod 27 in a state which combines a vibration movement in the vertical direction and a raising movement as described below. The upper slide 32 is coupled to a position adjusting bolt 36 which is attached to a cross bar 35 that is fixed to the upper end portions of the two frame rods 38. The height position during processing of the upper die 30 which is installed on the upper slide 32 is set by the position adjusting bolt 36.

The pressing device 50 comprises the two slides 22 and 32 described above, as well as a slide driving device 51 which drives the lower slide 22. As shown in FIG. 1, the major part of the slide driving device 51 is accommodated inside the base cabinet 90, thus making the ball joint manufacturing device 1 compact in size. During processing, the slide driving device 51 drives the lower slide 20 by means of the pressing rod 27 described above in a state which combines a vibration movement in the vertical direction and a raising movement, in such a manner that the distance between the lower die 20 and the upper die 30 gradually reduces, while the lower die 20 and the upper die 30 press intermittently in a repeated fashion in an inward radial direction against the outer surface of the wall of the socket 16. The slide driving device 51 comprises a first drive mechanism 52 which moves the lower die 20 upwards through a prescribed movement distance over a prescribed movement time period, and a second drive mechanism 53 which causes the lower die 20 to vibrate in the vertical direction at a shorter cycle than the aforementioned movement time period and with an amplitude that is smaller than the aforementioned movement distance, while the first drive mechanism is moving the lower die 20 upwards.

More specifically, as shown in FIG. 1, the slide drive device 51 has an arm 60 and the arm 60 is coupled rotatably via a rotating joint 62 to a supporting member 61 which is fixed on the lower surface of the ceiling plate 91. Two drive sources (typically, motors) 63, 64 are fixed to the arm 60. The second drive mechanism 53 described above comprises one of the motors 63 on the arm 60, a cylindrical cam 66 which is fixed to a rotating shaft 65 of the motor 63, a linking rod 67 which is coupled rotatably to the cylindrical cam 66, and the pressing rod 27 described above which is coupled rotatably to the linking rod 67 via the rotating joint 68. The central axis of the cylindrical cam 66 and the central axis of the rotating shaft 65 of the motor 63 are mutually displaced by a distance corresponding to half the amplitude of the vibration movement described above. During processing, the motor 63 repeats rotation a large number of times, at a cycle corresponding to the cycle of the vibration movement described above (for example, a cycle of several hundred milliseconds to approximately one second). By means of this plurality of rotations of the motor 63, the pressing rod 27 vibrates in the vertical direction at the amplitude and cycle described above, and the lower die 20 on the lower slide 22 is vibrated in a similar fashion.

Furthermore, the first drive mechanism 52 described above comprises the other motor 64 of the arm 60, a cylindrical cam 70 which is fixed to the rotating shaft 69 of the motor 64, a linking rod 71 which is coupled rotatably to the cylindrical cam 70, and a supporting member 72 which is coupled rotatably to the linking rod 71 via the rotating joint 73 and is fixed to the lower surface of the ceiling plate 91. The central axis of the cylindrical cam 70 and the central axis of the rotational shaft 69 of the motor 64 are displaced respectively by a distance which corresponds substantially to a distance calculated by multiplying half the movement distance of the aforementioned upward movement by the ratio between the distance from the center of the rotating joint 62 to the center of the rotating shaft 65 of the one motor 63 and the distance from the center of the rotating joint 62 to the center of the rotating shaft 69 of the other motor 64. During processing, the motor 64 is rotated through 180 degrees over the movement time period of the aforementioned upward movement (in other words, a processing time period, for example, from several tens of seconds to one hundred and several tens of seconds approximately). By means of this 180 degree rotation of the motor 64, during the aforementioned movement time period, the arm rotates upwards while pivoting about the rotating joint 62 as indicated by the dotted line (in other words, the second drive mechanism 53 described above rises upward), and the pressing rod 27 is raised up through the aforementioned movement distance, thereby causing the lower die 20 on the lower slide 22 to rise upward similarly.

Figure 5:
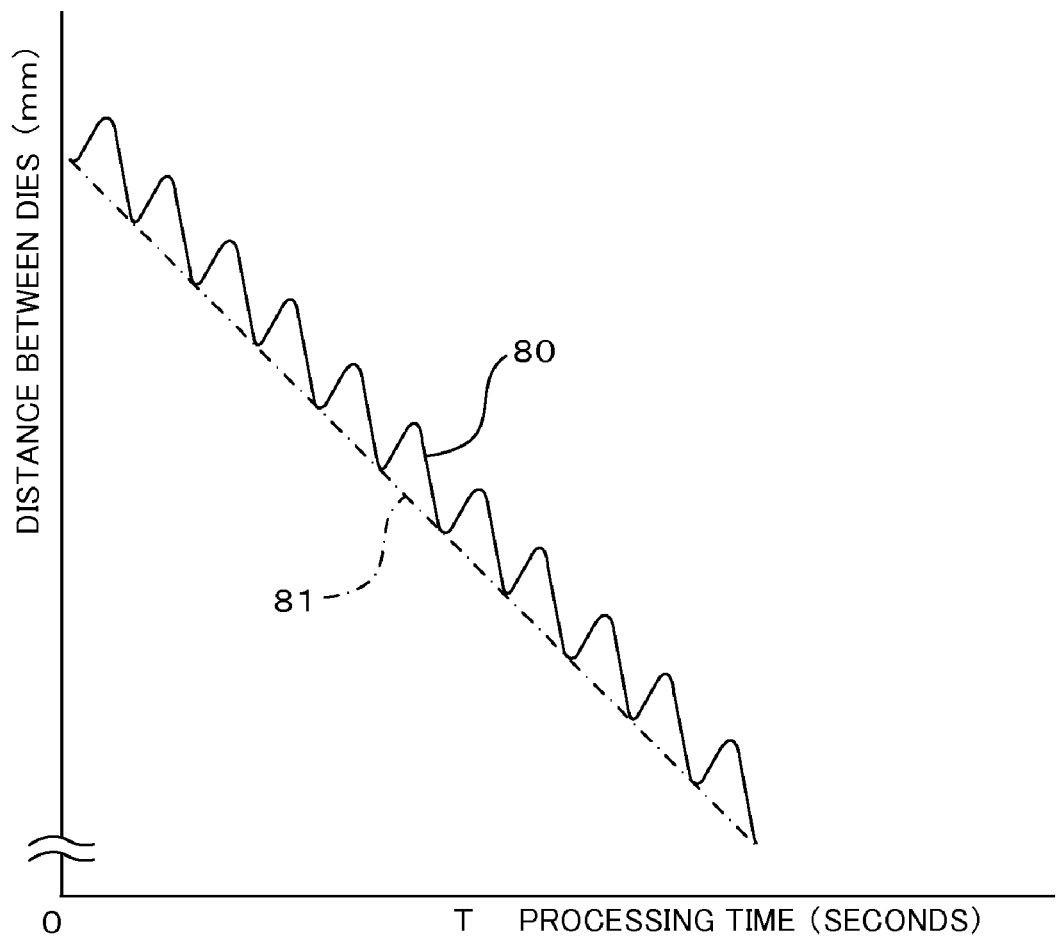
FIG. 5 is a diagram showing an aspect of change in the distance between the dies in a processing step.
Figure 6:
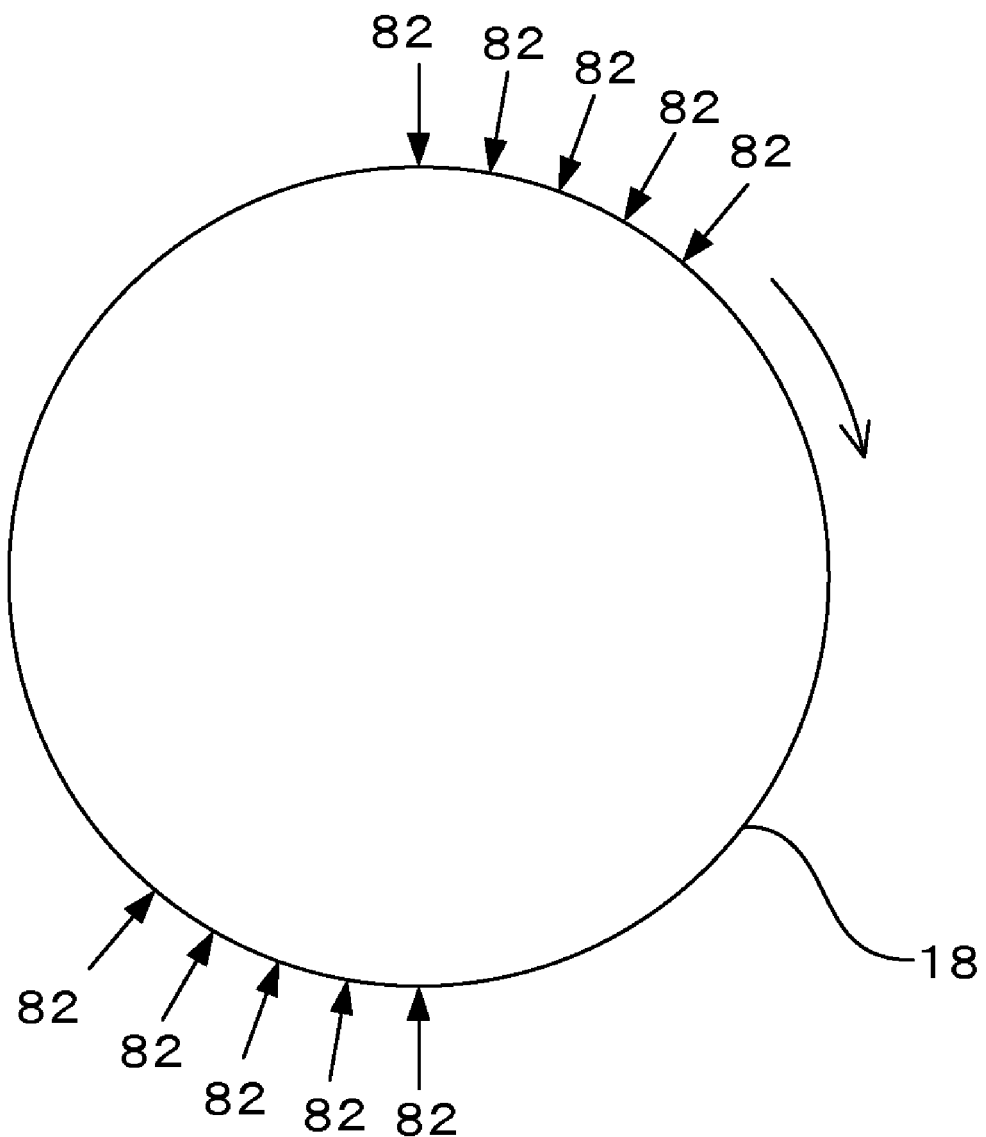
FIG. 6 is a diagram showing an aspect of successively pressing a large number of points on the outer surface of a socket during a processing step.

By means of the action of the first drive mechanism 52 and the second drive mechanism 53 described above, during processing, the distance between the lower die 20 and the upper die 30 becomes smaller during repeated vibration of a short cycle and a small amplitude as indicated by the solid curved line 80 in FIG. 5, while the distance of closest approach between the lower die and the upper die 30 in each cycle of the aforementioned vibration movement gradually becomes smaller as shown by an inclined dashed-dotted line 81 in FIG. 5. As a result of this, during processing, the lower die 20 and the upper die 30 press intermittently in a repeated fashion the outer surface of the wall 18 of the socket 16 of the shoe 15 in an inward radial direction at the frequency of the vibration movement. Furthermore, as described above, during processing, the rotating and supporting device 40 applies a torque to the shoe 15 (socket 16) and then, in each interval between the intermittently repeated pressing actions, rotates the socket 16 through a certain small angle (rotation being halted each time a pressing action is performed). Therefore, during processing, as shown in FIG. 6, a plurality of points 82, 82, . . . , covering the whole circumference of the outer surface of the wall 18 of the socket 16 are pressed successively, and the diameter of the wall 18 of the socket 16 proceeds to be reduced uniformly about the whole circumference. By setting the dynamic conditions of the intermittent pressing and rotating actions described above, it is possible to control the clearance between the ball section 14 and the socket 16 to an appropriate value. Furthermore, since a plurality of points 82, 82, 82, . . . , on the outer surface of the wall 18 of the socket 16 are pressed successively, then wrinkles are not liable to occur on the surface of the wall 18, in comparison with a case where the whole outer surface of the wall of the socket is pressed simultaneously in a constricted state, as is the case in a conventional caulking process. Moreover, parting lines do not occur on the outer surface of the socket 16 either. As described above, the processing time T can be from several tens of seconds to around one hundred and several tens of seconds, for instance, and the vibration cycle can be from several hundred milliseconds to around one second, for instance, but these are simply examples and the optimal values vary with the specifications of the ball joint 10.

Next, the concrete shape and functions of the dies 20, used in the ball joint manufacturing device 1 according to the present embodiment will be described. Here, in the present embodiment, the two dies 20 and 30 have basically the same shape, and therefore the shape of only one of the dies 20 is described.

Figure 7A:
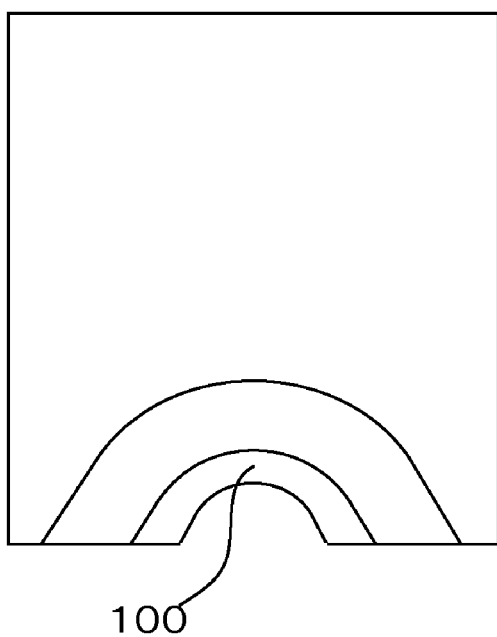
FIG. 7A and FIG. 7B are a front diagram of a die and a cross-sectional diagram along the plane of the axis of symmetry of a die, showing one example of the shape of a die.
Figure 7B:
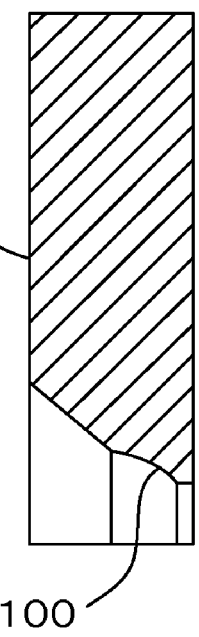
Figure 8A:
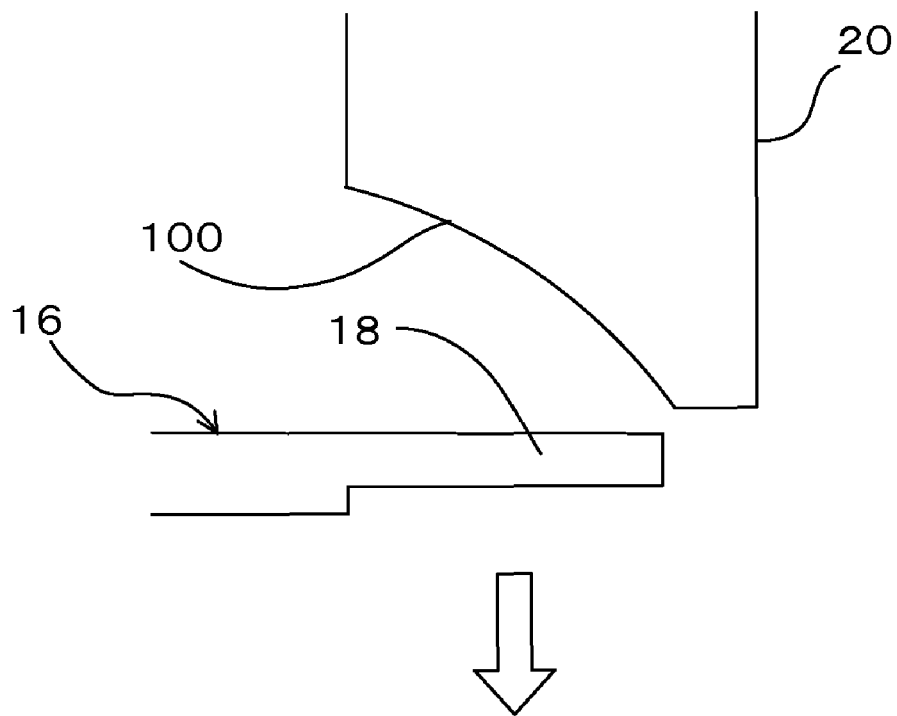
FIG. 8A and FIG. 8B are cross-sectional diagrams showing a state before the die shown in FIGS. 7A and 7B presses against the wall of the socket and a state while the die is pressing against same.
Figure 8B:
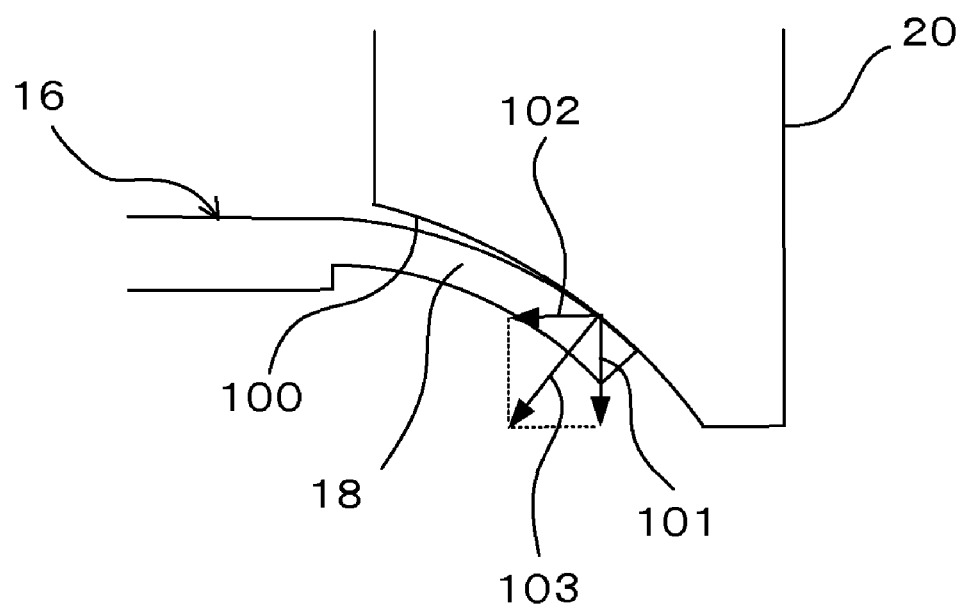

FIG. 7A and FIG. 7B are respectively a front view of a die 20 showing one example of the shape of the die 20, and a cross-sectional diagram of same along the plane of the axis of symmetry. FIG. 8A and FIG. 8B are cross-sectional diagrams showing a state before the die 20 is pressed against the wall 18 of the socket 16 and a state where the die 20 is being pressed against same.

As shown in FIGS. 7A and 7B and FIGS. 8A and 8B, the die 20 has a pressing surface 100 which abuts against and presses the outer surface of the wall 18 of the socket 16. As shown in FIG. 7A, the pressing surface 100 bends in a concave shape in terms of the cross-sectional shape following the circumference of the wall 18, with a radius of curvature that is slightly greater than the outer diameter of the wall 18 of the socket 16, and as shown in FIG. 7B, the pressing surface 100 bends in a concave shape with a prescribed radius of curvature in terms of the cross-sectional shape following the central axis of the socket 16. In this way, the pressing surface 100 has a three-dimensional concave shape (substantially a concave spherical shape). As FIGS. 8A and 8B reveal, the concave surface-shaped pressing surface 100 presses the outer surface of the wall 18 of the socket 16 in an oblique direction 103 having a directional component 101 toward the inward radial direction of the socket 16 (wall 18) and a directional component 102 toward the rearward axial direction. In this way, by pressing the wall 18 of the socket 16 in an oblique direction 103 having an inward radial direction component 101 and a rearward axial direction component 102, rather than simply pressing the wall 18 only in the inward radial direction, then it becomes easier to bend the wall 18 of the socket 16 inward while controlling the clearance between the ball section 14 and the socket 16 to a suitable value.

Figure 9A:
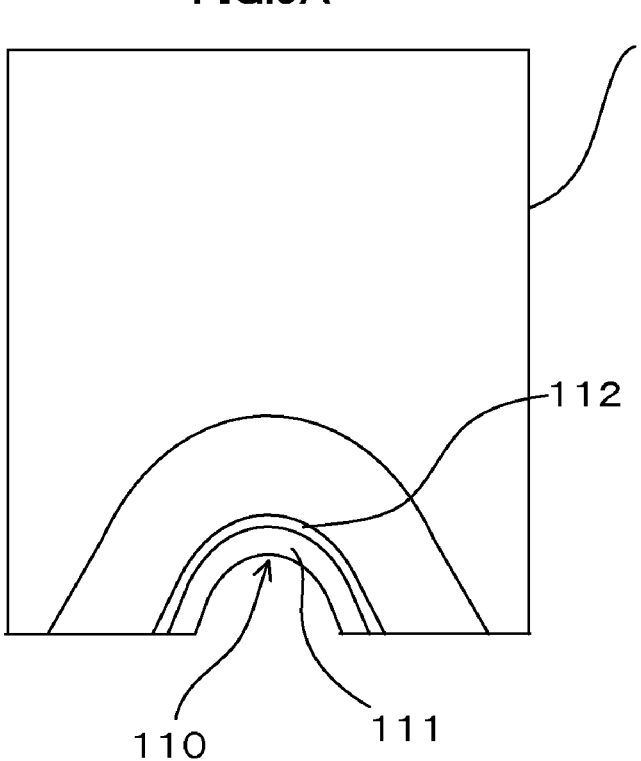
FIG. 9A, FIG. 9B and FIG. 9C are a front view diagram of a die showing a further example of the shape of a die, a cross-sectional diagram along the plane of the axis of symmetry of same, and an enlarged cross-sectional diagram of a pressing section.
Figure 9B:
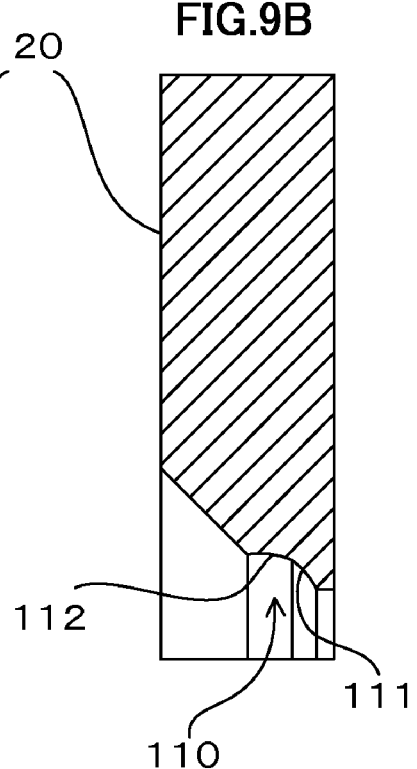
Figure 9C:
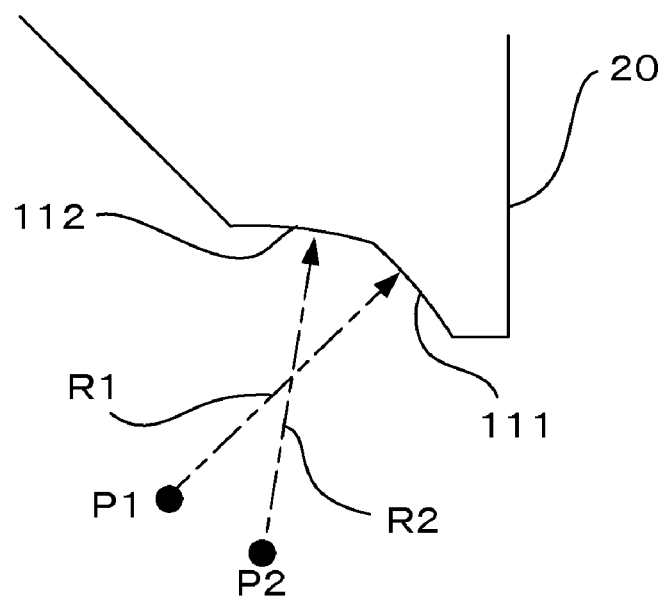
Figure 10A:
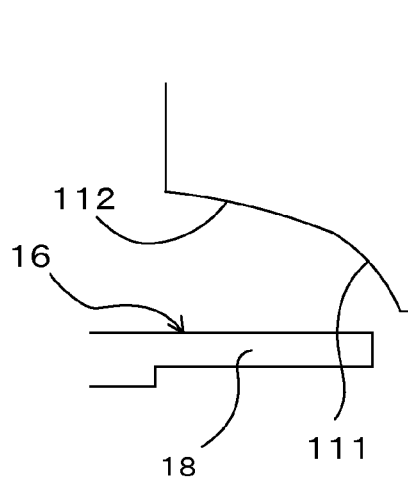
FIG. 10A, FIG. 10B and FIG. 10C are cross-sectional diagrams showing a state before the die shown in FIGS. 9A to 9C presses the wall of the socket, a state during pressing in an early stage of a processing step and a state during pressing in a later stage.
Figure 10B:
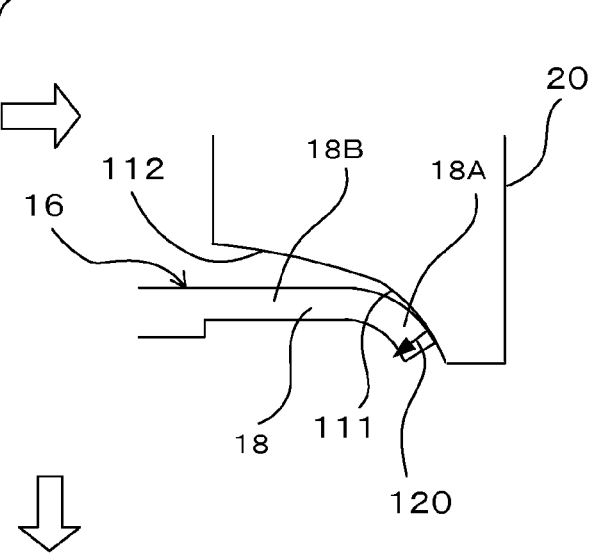
Figure 10C:
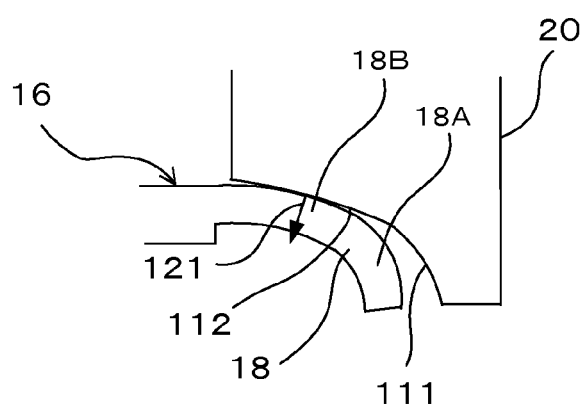

FIG. 9A, FIG. 9B and FIG. 9C respectively show a front view diagram of a die 20 showing a further example of the shape of the die 20, a cross-sectional view along the plane of the axis of symmetry thereof, and an enlarged cross-sectional view of the pressing section. FIG. 10A, FIG. 10B and FIG. 10C are cross-sectional diagrams showing a state before the die 20 shown in FIGS. 9A to 9C is pressed against the wall 18 of the socket 16, a state during pressing in an early phase of a processing step, and a state during pressing in a later phase of a processing step.

As shown in FIGS. 9A to 9C, the die 20 has a pressing surface 110 having a three-dimensional concave surface shape, and the pressing surface 110 has a plurality of (for example, two) subsidiary pressing surfaces 111 and 112 which respectively have mutually different three-dimensional concave surface shapes. These subsidiary pressing surfaces 111, 112 each have substantially a concave spherical surface shape, for example, but differ from each other in terms of their arrangement, radius of curvature R1, R2 and (or) the position of the center of curvature P1, P2. In other words, the first subsidiary pressing surface 111 is disposed at a position nearer to the front end in the axial direction of the socket 16 and further inward in the radial direction, in comparison with the second subsidiary pressing surface 112, and the angle of inclination of the first subsidiary pressing surface 111 with respect to the outer surface of the wall 18 of the socket 16 is steeper. The concrete specifications of the different arrangements and concave surface shapes of these first and second subsidiary pressing surfaces 111, 112 are set in such a manner that the subsidiary pressing surfaces 111, 112 display an action such as that described below in the processing step.

More specifically, as shown in FIG. 10B in an early phase of the processing step, the first subsidiary pressing surface 111 only abuts against the outer surface of a first portion 18A of the wall 18 of the socket 16 which is near to the front end thereof (in other words, disposed on the forward side in the axial direction), and presses this portion of the wall in an oblique direction 120 which has an inward radial direction component and a rearward axial direction component. At this time, the second subsidiary pressing surface 112 has not yet made contact with the wall 18. In this early stage, as described previously with reference to FIG. 6, a plurality of points on the outer surface of the first portion 18A of the wall 18 are pressed successively, and the first portion 18A is thereby bent inward to reduce the diameter thereof. When the first portion 18A has been bent by a suitable amount, the processing step transfers to a later stage in such a manner that the second subsidiary pressing surface 112, not the first subsidiary pressing surface 111, makes contact with the wall 18.

As shown in FIG. 10C, in the later stage of the processing step, the second subsidiary pressing surface 112 only abuts against the outer surface of a second portion 18B of the wall 18 which is distant from the front end thereof, and presses this portion of the wall in an oblique direction 121 having an inward radial direction component and a rearward axial direction component. At this time, the first subsidiary pressing surface 111 does not make initial contact with the wall 18. In this later stage also, as described previously with reference to FIG. 6, a plurality of points on the outer surface of the second portion 18B of the wall 18 are pressed successively, and the second portion 18B of the wall is bent inward so as to reduce the diameter thereof. When the second portion 18B has been bent by a suitable amount, the processing step ends.

In this way, by adopting a processing sequence in which the portion of the wall 18 of the socket 16 near to the front end thereof is bent first and the portion of the wall 18 distant from the front end is bent subsequently, by means of the plurality of subsidiary pressing surfaces 111 and 112 having different arrangements and shapes, it becomes yet easier to deform the wall 18 of the socket 16 so as to achieve a suitable clearance between the socket 16 and the ball section 14. In FIGS. 9A to 9C and FIGS. 10A to 10C, these subsidiary pressing surfaces 111 and 112 are depicted as curved surfaces which have a clearly defined boundary therebetween (in other words, the tangential directions are clearly different at the boundary), but this does not have to be the case and it is also possible for these curved surfaces to have an indistinct boundary therebetween (in other words, the tangential directions are the same or similar to each other at the boundary). Alternatively, in the case of a die 20 which has a pressing surface 100 constituted by a single concave surface such as that shown in FIGS. 8A and 8B, it is also possible to change the radius of curvature of the pressing surface 100 and (or) the position of the center of curvature in accordance with the position within the single pressing surface 100 (in particular, according to the axial directional position), in such a manner that the position of processing on the wall 18 progressively moves from a position near to the front end to a position distant from the front end during the processing step, as shown in FIGS. 10A to 10C. As a mode for moving the position of processing on the wall 18 in the axial direction during the processing step as described above, it is possible to adopt non-continuous movement whereby processing jumps between separate positions, or continuous movement whereby processing passes through consecutive positions in a successive fashion.

A processing procedure which moves the position of processing on the wall 18 from a position near the front end to a position distant from same as described above is especially useful under conditions where, for example, the material of the wall 18 of the socket 16 is harder than the material of the ball section 14.

Figure 11:
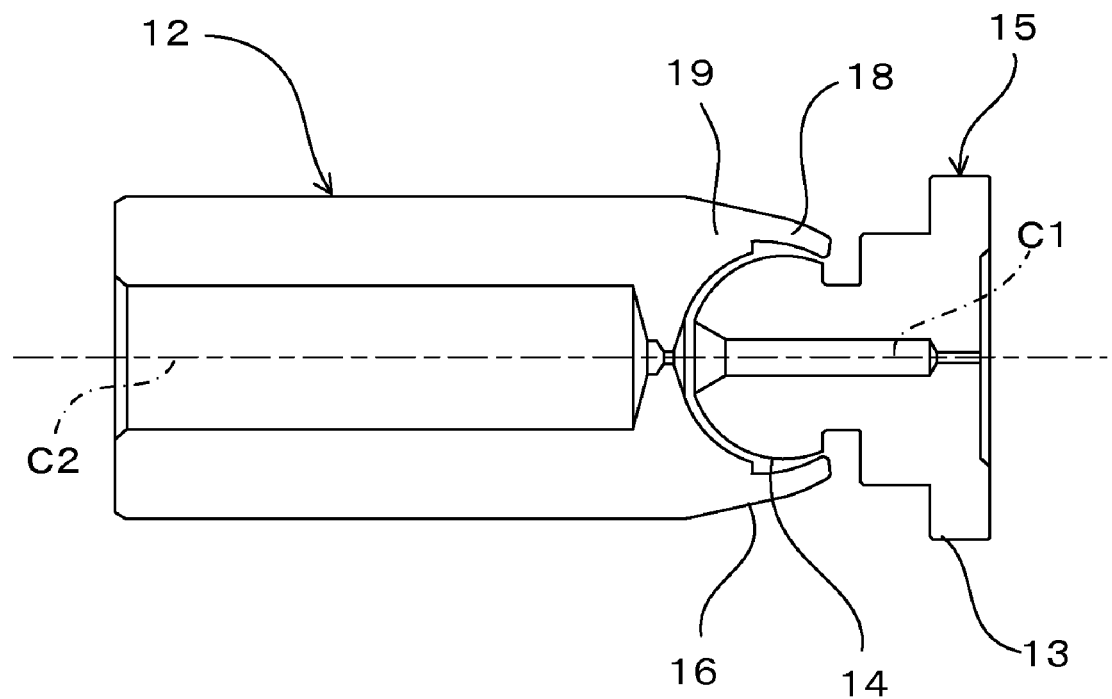
FIG. 11 is a cross-sectional diagram showing the structure of one example of a ball joint suited to the application of the processing sequence shown in FIGS. 10A to 10C.

FIG. 11 shows one typical example of a ball joint which meets these conditions.

The ball joint 200 shown in FIG. 11 is constituted by a piston 12 and a shoe 15 of a hydraulic swash plate piston pump, similarly to the ball joint 10 shown in FIG. 3 and described previously, but differs from the ball joint 10 shown in FIG. 3 in that the shoe 15 has a ball section 14 and the piston 12 has a socket 16. In general, the piston 12 is made from a hard material such as steel, and the shoe 15 is made from a soft material such as alloy metal, and therefore the socket 16 is harder than the ball section 14.

In order to reduce the diameter of the wall 18 of a socket 16 of a ball joint 200 which meets conditions of this kind, it is desirable to employ a processing sequence such as that described above in which the position of processing on the wall 18 is moved from a position near the front end to a position distant from same. Of course, this processing sequence can also be applied under conditions where the socket 16 is softer than the ball section 14, which are the conditions typically present in a ball joint 10 such as that shown in FIG. 3.

A preferred embodiment of the present invention has been described above, but the foregoing embodiment is an example for the purpose of explaining the present invention and the range of the present invention is not limited to the foregoing embodiment alone. The present invention can also be implemented in various modes which differ from the embodiment described above, without departing from the essence of the invention.

For example, many different variations can be adopted in the concrete composition of the dies 20, 30, the rotating and supporting device 40 and the pressing device 50. For example, for the pressing device 50, it is possible to employ pressing devices of various types other than the cam press device described above, such as a crank press device, other linked motion press devices, a screw press device, a fluid pressure pressing device, or the like.

The slide driving device 51 of the pressing device 50 can also be disposed, rather than below the rotating and supporting device 40, in a position above or in another direction from the rotating and supporting device 40.

It is also possible to rotate the dies 20, 30 about the socket 16, instead of rotating the socket 16 between the dies 20, 30.

The ball joint that is the object of processing may be a joint having various other types of application and structure, apart from a joint constituted by a piston and a shoe of a hydraulic swash plate piston pump.

The vibration movement of the dies 20 and 30 during processing does not have to be a vibration having a large and clear spatial amplitude in which the dies 20 and 30 approach each other and then separate from each other, as in the example illustrated by the curve 80 in FIG. 5. For example, the vibration movement may also be one having a very small spatial amplitude, provided that it comprises a pressure vibration in which a pressing force of a magnitude suitable for processing is applied intermittently to the socket 16 (a vibration which repeats pressing and release of pressing). In other words, the spatial vibration of the dies 20 and 30 should be such that the distance between the dies 20 and 30 widens by the minimum necessary margin required to be able to rotate the socket 16 in the interval between the intermittently repeated pressing actions.

The invention claimed is:

1. A device for manufacturing a ball joint provided with a first member having a ball section and a second member having a substantially cylindrical socket which accommodates the ball section, the device comprising:

a pair of dies for reducing the diameter of a wall which surrounds an opening of the socket of the second member;

a rotating and supporting device which supports the first and second members in a state where the ball section is accommodated inside the socket, and which applies a rotational torque to the second member so as to rotate the socket relatively with respect to the pair of dies about the central axis of the socket; and a pressing device which supports the pair of dies such that the pair of dies sandwich the wall of the socket from an outer side thereof in a radial direction while the rotating and supporting device supports the second member and applies a rotational torque thereto, and which drives at least one of the pair of dies such that the pair of dies press repeatedly and intermittently in an inward radial direction against the outer surface of the wall of the socket.

2. The device for manufacturing a ball joint according to claim 1, wherein the pressing device repeatedly vibrates at least one of the pair of dies in the radial direction of the socket, while gradually reducing, in each cycle of the vibration, a distance of closest approach between the pair of dies.

3. The device for manufacturing a ball joint according to claim 2, wherein the pressing device comprises:

a first drive mechanism which moves at least one of the pair of dies forward through a prescribed movement distance in the radial direction over a prescribed movement time period; and a second drive mechanism which vibrates at least one of the pair of dies in the radial direction with a cycle that is shorter than the movement time period and an amplitude that is smaller than the movement distance, while the first drive mechanism is moving the at least one of the pair of dies forward.

4. The device for manufacturing a ball joint according to claim 1, wherein the rotating and supporting device comprises:

a motive power source which generates rotational torque for rotating the second member;

a chucking device which holds the second member; and a rotational torque control device which transmits torque from the motive power source to the chucking device, and the rotational torque control device adjusts the torque transmitted from the motive power source to the chucking device such that the rotation of the second member is halted or restricted when the socket is pressed by the pair of dies.

5. The device for manufacturing a ball joint according to claim 1, wherein each of the pair of dies has a concave surface-shaped pressing surface which abuts against the outer surface of the wall of the socket and presses the wall in an oblique direction having an inward radial direction component and a rearward axial direction component.

6. The device for manufacturing a ball joint according to claim 1, wherein each of the pair of dies has a first subsidiary pressing surface disposed so as to abut against the outer surface of a first portion of the wall of the socket which is near to the front end of the wall and a second subsidiary pressing surface disposed so as to abut against the outer surface of a second portion of the wall which is distant from the front end of the wall, the first subsidiary pressing surface of each of the pair of dies is configured to press against the first portion to thereby reduce the diameter thereof during an early phase of repetition of intermittent pressing, and the second subsidiary pressing surface of each of the pair of dies is configured to press against the second portion to thereby reduce the diameter thereof during a later phase of repetition of intermittent pressing.

7. The device for manufacturing a ball joint according to claim 5, wherein each of the pressing surfaces has a first subsidiary pressing surface and a second subsidiary pressing surface, wherein each subsidiary pressing surface has a substantially spherical shape characterized by a radius and a center of curvature, and wherein at least one of the radius and the center of curvature of the first subsidiary pressing surface differs from the respective radius and the center of curvature of the second subsidiary pressing surface.

8. A method of manufacturing a ball joint provided with a first member having a ball section and a second member having a substantially cylindrical socket which accommodates the ball section, the method comprising:

a step of disposing a pair dies for reducing the diameter of a wall surrounding an opening of the socket of the second member so as to sandwich the wall of the socket from an outer side thereof in a radial direction;

a step of pressing the outer surface of the wall of the socket repeatedly and intermittently in an inward radial direction by means of the disposed pair of dies, in a state where the ball section is accommodated inside the socket; and a step of rotating the socket relatively with respect to the pair of dies about the central axis of the socket in an interval between the intermittently repeated pressing actions.

9. The device for manufacturing a ball joint according to claim 6, wherein each of the first and second subsidiary pressing surfaces has a substantially concave spherical surface shape characterized by a radius and a center of curvature, and wherein at least one of the radius and the center of curvature of the first subsidiary pressing surface differs from the respective radius and the center of curvature of the second subsidiary pressing surface.

* * * * *